(12) United States Patent
Umezaki et al.

(10) Patent No.: US 7,929,255 B2
(45) Date of Patent: Apr. 19, 2011

(54) MAGNETIC HEAD INSPECTION SYSTEM, MAGNETIC HEAD INSPECTION METHOD AND MAGNETIC DISK DRIVE MANUFACTURING METHOD

(75) Inventors: Hiroshi Umezaki, Kanagawa (JP); Shinichi Iwasa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 660 days.

(21) Appl. No.: 12/072,751

(22) Filed: Feb. 27, 2008

(65) Prior Publication Data
US 2008/0204913 A1 Aug. 28, 2008

(30) Foreign Application Priority Data
Feb. 27, 2007 (JP) .................................. 2007-046733

(51) Int. Cl.
*G11B 21/10* (2006.01)
(52) U.S. Cl. ...................................................... 360/270
(58) Field of Classification Search .................. None
See application file for complete search history.

(56) References Cited

U.S. PATENT DOCUMENTS

| | | | | |
|---|---|---|---|---|
| 7,035,039 B2 * | 4/2006 | Shitara et al. | ............... | 360/77.07 |
| 7,126,778 B2 * | 10/2006 | Lamberts | ........................ | 360/69 |
| 7,219,028 B2 | 5/2007 | Bae et al. | | |
| 7,426,088 B2 * | 9/2008 | Takase et al. | .................... | 360/69 |
| 2004/0156146 A1 * | 8/2004 | Nakano et al. | ............. | 360/264.2 |
| 2005/0117241 A1 * | 6/2005 | Wang et al. | ..................... | 360/53 |
| 2006/0092548 A1 | 5/2006 | Mihara et al. | | |

FOREIGN PATENT DOCUMENTS
JP 2006-268955 A 10/2006
* cited by examiner

*Primary Examiner* — Mark Blouin
(74) *Attorney, Agent, or Firm* — Mahamedi Paradice Kreisman LLP; Christopher J. Brokaw

(57) ABSTRACT

Embodiments of the present invention provide a magnetic head inspection system having a simple configuration capable of inspecting magnetic heads. According to one embodiment, the magnetic head inspection system comprises an inspection module which is provided with a magnetic disk where servo data including track identifier information are recorded, a spindle motor, a carriage having a mount structure to which a head assembly containing a magnetic head is secured, a voice coil motor and a main circuit section. An inspection circuit section instructs the main circuit section to execute control so as to move the magnetic head to a specific track and perform a certain read write operation by the magnetic head in order to inspect the magnetic head.

34 Claims, 8 Drawing Sheets

MAGNETIC HEAD INSPECTION SYSTEM, MAGNETIC HEAD INSPECTION METHOD AND MAGNETIC DISK DRIVE MANUFACTURING METHOD

CROSS-REFERENCE TO RELATED APPLICATION

The instant nonprovisional patent application claims priority to Japanese Patent Application No. 2007-046733 filed Feb. 27, 2007 and which is incorporated by reference in its entirety herein for all purposes

BACKGROUND OF THE INVENTION

Magnetic heads which are to be applied to hard disk, and other magnetic disk drives must be screened in order to secure the quality and manufacturing yield of magnetic disk drives. Thus, a magnetic head is supplied to a magnetic head inspection apparatus after incorporation into an head assembly which comprises the magnetic head and components to support the head. As a part of this head assembly called a head gimbal assembly (HGA), the magnetic head is inspected by the magnetic head inspection apparatus. With the magnetic head kept floating above a magnetic disk, the magnetic head inspection apparatus inspects characteristics of the magnetic head by performing, predetermined read and write operations with the magnetic head.

For example, a magnetic head inspection apparatus disclosed in Japanese Patent Publication No. 2006-268955 uses a piezo-actuator to locate a magnetic head over a magnetic head based on servo signals recorded on the magnetic disk. The servo signals described here are burst signals to determine the position of the magnetic head relative to tracks.

BRIEF SUMMARY OF THE INVENTION

Embodiments of the present invention provide a magnetic head inspection system having a simple configuration capable of inspecting magnetic heads. According to the particular embodiment of FIG. 3, the magnetic head inspection system comprises an inspection module 12 which is provided with a magnetic disk 23 where servo data including track identifier information are recorded, a spindle motor 24, a carriage 25 having a mount structure 24 to which a head assembly 40 containing a magnetic head is secured, a voice coil motor 26 and a main circuit section 27. An inspection circuit section 21 instructs the main circuit section 27 to execute control so as to move the magnetic head to a specific track and perform a certain read write operation by the magnetic head to inspect the magnetic head.

DETAILED DESCRIPTION OF THE INVENTION

Figure 1:
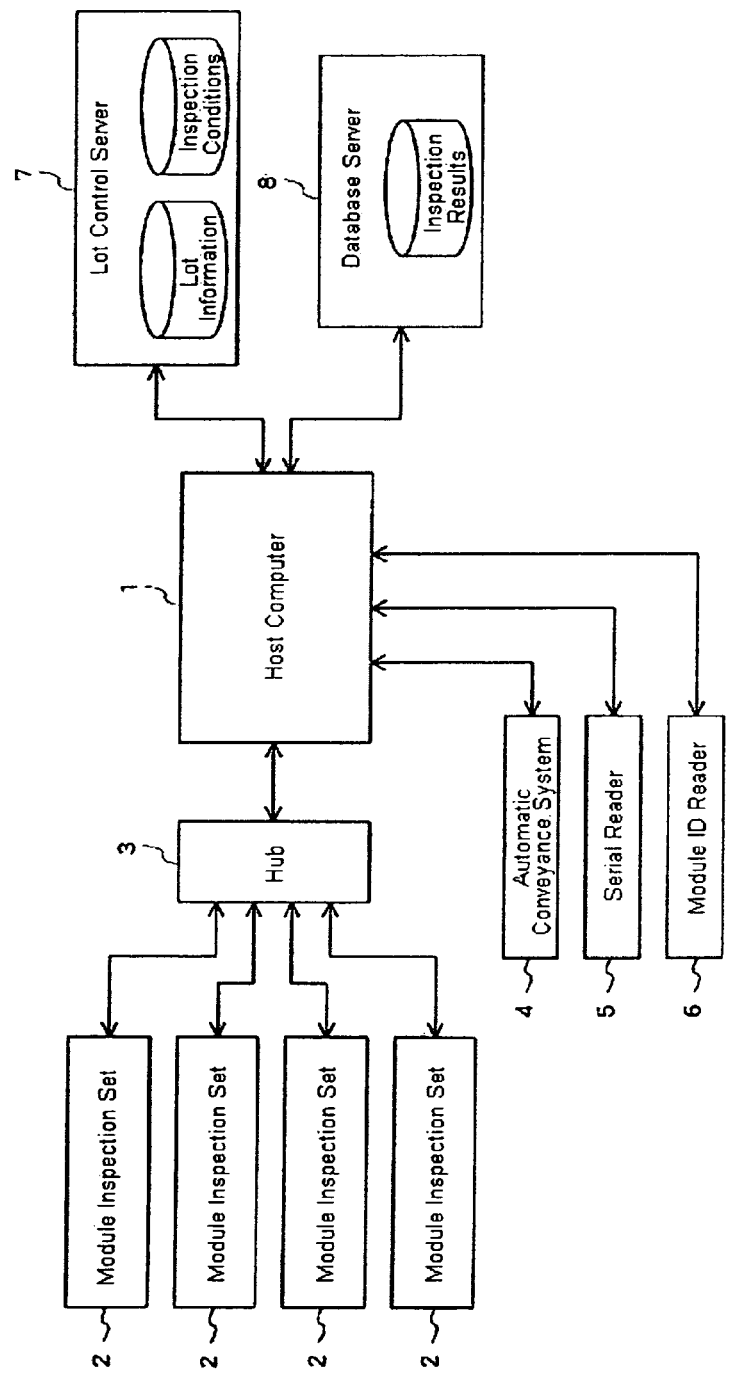
FIG. 1 shows the configuration of a magnetic head inspection system according to an embodiment of the present invention.

Embodiments of the present invention relate to a magnetic head inspection system to inspect magnetic heads which are to be applied to hard disk and other magnetic disk drives, a magnetic head inspection method thereof, and a manufacturing method of magnetic disk drives.

It is an object of embodiments of the present invention to provide a magnetic head inspection system, magnetic head inspection method and magnetic disk drive manufacturing method which allow a simple configuration to inspect magnetic heads.

To solve the above-mentioned problem, a magnetic head inspection system of embodiments of the present invention comprises one or a plurality of inspection modules each of which includes: a magnetic disk where servo data including track identifier information are recorded; a spindle motor to rotates the magnetic disk; a support member which has a mount structure to which a head assembly including a magnetic head is detachably secured and can pivot around a pivot axis defined outside the magnetic disk; a voice coil motor which drives the support member to pivot so that the magnetic head included in the head assembly mounted on the support member is moved over the magnetic disk substantially in a radial direction thereof; and a main circuit section which is electrically connected with the magnetic head included in the head assembly mounted on the support member and can execute read write control to read data from and write data to the magnetic disk by the magnetic head and positioning control to drive the voice coil motor based on the servo data included in the data retrieved from the magnetic disk; wherein each of the one or plurality of inspection modules is provided with an inspection circuit section which instructs the main circuit section to execute the positioning control to move the magnetic head included in the head assembly mounted on the support member to a specific track on the magnetic disk and the read write control to perform a certain read write operation by the magnetic head in order to inspect the performance of the magnetic head.

Another embodiment of a magnetic head inspection system according to the present invention further comprises a conveyance mechanism which conveys the head assembly and attaches and detaches the head assembly to and from the mount structure of the support member.

Another embodiment of a magnetic head inspection system according to the present invention is characterized in that in each of the one or plurality of inspection modules, at least the magnetic disk, the spindle motor, the support member and the voice coil motor are installed on a module base.

Another magnetic head inspection system according to an embodiment the present invention is characterized in that in each of the one or plurality of inspection modules, the support member keeps the head assembly above the top side of the magnetic disk installed on a module base.

Another embodiment of a magnetic head inspection system of the present invention is characterized in that in each of the one or plurality of inspection modules: the spindle motor contains a fluid bearing; the support member keeps the head assembly above the top side of the magnetic disk installed on a module base; of the two types of head assemblies, namely those which are to be arranged on a first side of a magnetic disk in a magnetic disk drive and those which are to be arranged on a second side thereof, only one type which is determined depending on the rotating direction of the spindle motor and the top side condition of the magnetic disk is allowed to be set to the support member.

Still another magnetic head inspection system of an embodiment of the present invention is characterized in that the inspection circuit section switches the specific track between a plurality of tracks which are apart from each other by a distance larger than the width of the slider contained in the head assembly.

A magnetic head inspection method of embodiments of the present invention uses one or a plurality of inspection modules each of which comprises: a magnetic disk where servo data including track identifier information are recorded; a spindle motor to rotates the magnetic disk; a support member which has a mount structure to which a head assembly including a magnetic head is detachably secured and can pivot around a pivot axis defined outside the magnetic disk; a voice coil motor which drives the support member to pivot so that the magnetic head included in the head assembly mounted on the support member is moved over the magnetic disk substantially in a radial direction thereof; and a main circuit section which is electrically connected with the magnetic head included in the head assembly mounted on the support member and can execute read write control to read data from and write data to the magnetic disk by the magnetic head and positioning control to drive the voice coil motor based on the servo data included in the data retrieved from the magnetic disk; wherein each of the one or a plurality of inspection modules is instructed to execute the positioning control to move the magnetic head included in the head assembly mounted on the support member to a specific track on the magnetic disk and the read write control to perform a certain read write operation by the magnetic head in order to inspect the performance of the magnetic head.

A magnetic disk drive manufacturing method of embodiments of the present invention includes the above-mentioned magnetic head inspection method.

According to embodiments of the present invention, a simple configuration similar to a magnetic disk drive can inspect a magnetic head by moving the magnetic head to a specific track on a magnetic disk and performing a certain read write operation there by the magnetic head.

Embodiments of the present invention will be described with reference to the drawings.

FIG. 1 shows the configuration of a magnetic head inspection system according to an embodiment of the present invention. The magnetic head inspection system is constructed around a host computer 1. Via a relay hub 3, this host computer 1 is connected with a plurality of module inspection sets 2 each of which has a head assembly attached therein to inspect the magnetic head. Each head assembly is an assembly into which a magnetic head and such components as to support the magnetic head are assembled. It is called a head gimbal assembly (HGA). How the module inspection set 2 and the head assembly are configured will be described later in detail.

The host computer 1 instructs each module inspection set 2 to inspect the magnetic head. Receiving this instruction, each module inspection set 2 performs an inspection on the magnetic head and, upon completion, sends the inspection result together with an inspection completion notification to the host computer 1.

The host computer 1 is also connected with: an automatic conveyance system 4 which carries head assemblies and attach them to module inspection sets 2; a serial reader 5 which reads a serial number set to each head assembly; and a module ID reader 6 which reads an ID set to an inspection module included in each module inspection set 2. The host computer 1 controls the automatic conveyance system 4, serial reader 5 and module ID reader 6 so that they operate as predefined. The host computer 1 also acquires head assembly serial numbers and inspection module IDs which are read respectively by the serial reader 5 and module ID reader 6.

In addition, the host computer 1 is connected with: a lot control server 7 where lot information about head assemblies and inspection conditions associated with this lot information are stored; and database server 8 where inspection results of head assemblies are stored. The host computer 1 reads out an inspection condition associated with specified head assemblies from the lot control server 7 and sets the read inspection condition to the respective module inspection set 2. In addition, the host computer 1 receives an inspection result from each module inspection set 2 and stores it in the database server 8 in association with the head assembly's serial number and other information.

Figure 2:
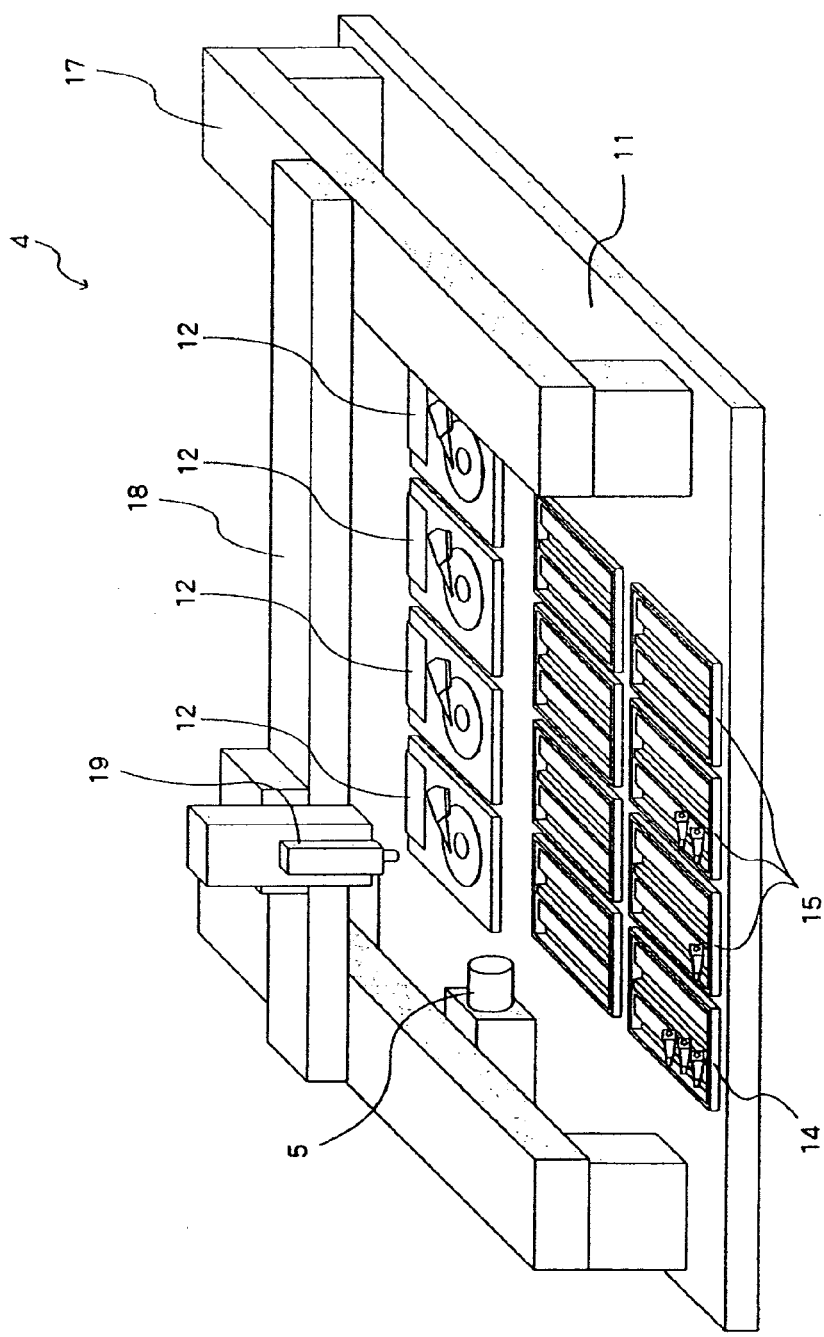
FIG. 2 shows an example of the configuration of an inspection stage.

FIG. 2 shows an example of the configuration of an inspection stage 11 which constitutes a part of the magnetic head inspection system. On the inspection stage 11, a plurality of inspection modules 12 are arranged. These plural inspection modules 12 are respectively included in the above-mentioned module inspection sets 2. Each inspection module 12 is composed of a carriage having a mount structure to which a head assembly is detachably fixed, a magnetic disk, a spindle motor, a voice coil motor and so on. The configuration of the inspection module 12 will be described later in detail.

On the inspection stage 11, there are also arranged supply trays 14 in which head assemblies to be inspected are placed and sorting trays 15 where inspected head assemblies are placed. The sorting trays 15 are associated with grades. Inspected head assemblies are sorted by grade according to their inspection results.

In addition, the automatic conveyance system 4 is set on the inspection stage 11. The automatic conveyance system 4 comprises a X-axis rail 17, a Y-axis rail 18 and a pickup mechanism 19. The X-axis rail 17 and Y-axis rail 18 respectively include linear motors and can move the pickup mechanism 19 in a plane parallel to the stage surface of the inspection stage 11. The pickup mechanism 19 can move up and down perpendicularly to the stage surface of the inspection stage 11 as well as taking hold of a head assembly.

Thus, the automatic conveyance system 4 can pick up a head assembly from a supply tray 14, carry it to the position of an inspection module 12 and set it to the mount structure of the inspection module 12. In addition, the automatic conveyance system 4 can detach a head assembly from an inspection module 12, carry it to the position of a sorting tray 15 and put it on the sorting tray 15.

In addition, the serial reader 5 is fixed to the X-axis rail between the supply trails 14 and the inspection modules 12. The serial reader 5 reads the serial number of a head assembly which is carried from a supply tray 14 to an inspection module 12.

Figure 3:
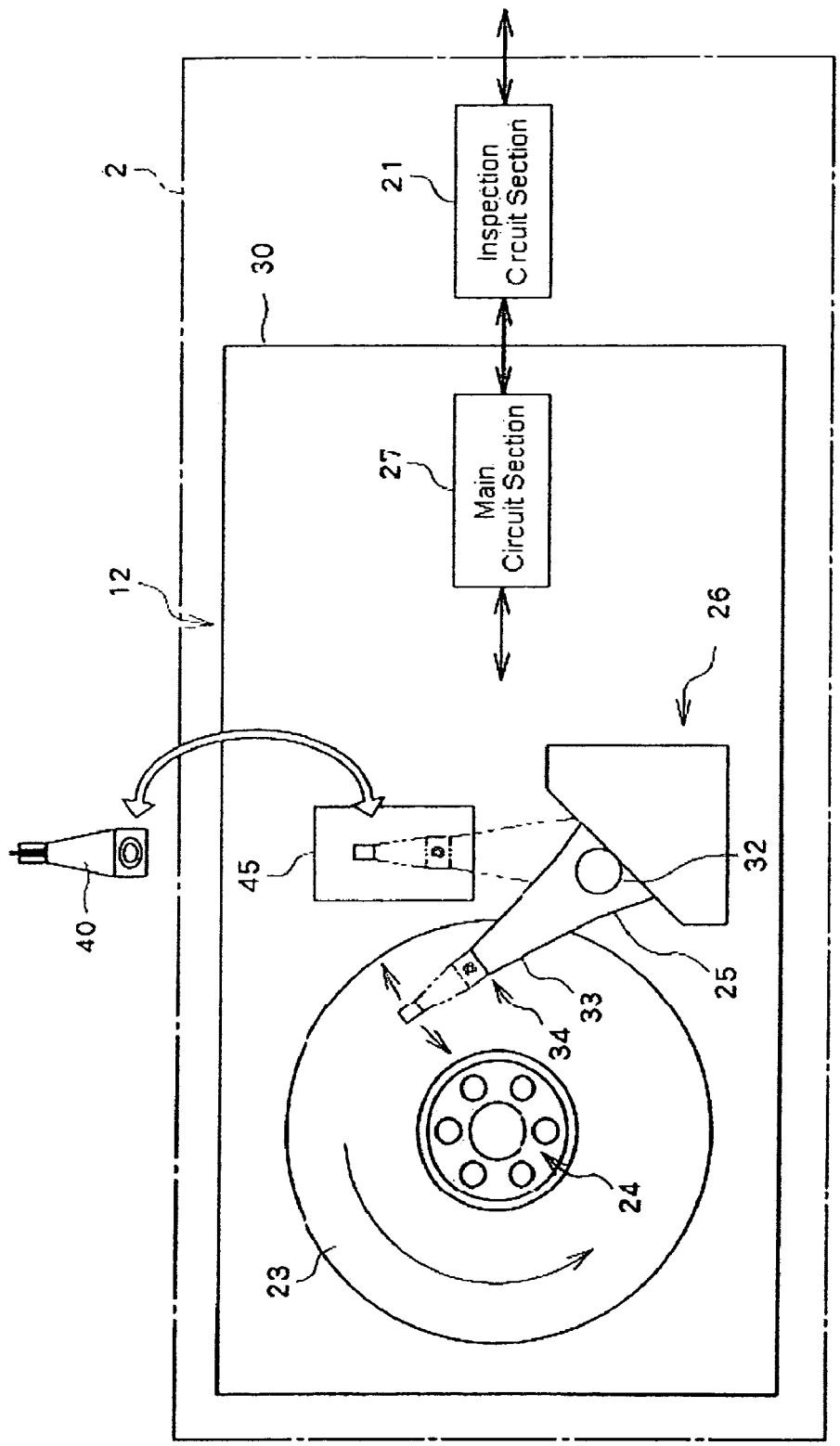
FIG. 3 shows an example of the configuration of a module inspection set.

FIG. 3 shows an example of the configuration of the module inspection set 2. The module inspection set 2 includes an inspection module 12 and an inspection circuit section 21. This inspection module 12 includes a magnetic disk 23, a spindle motor 24, a carriage 25 as a holder, a voice coil motor 26 and a main circuit section 27 which are arranged on a module base 30. In this figure, the module base 30 and others are depicted as viewed from above.

The magnetic disk 23 has a plurality of concentric tracks formed thereon around the disk's center of rotation. On each track, servo data are recorded at certain intervals. The servo data include servo marks, track data, sector data and burst signals. Of them, the track data, which is identifier information to identify the track among plural tracks, represents a track number, one of serial numbers assigned to the plural tracks. The burst signals are signals to determine the position of the magnetic head relative to tracks. Thus, the magnetic disk 23, for example, may be same as a magnetic disk which is applied to the product magnetic disk drive.

The spindle motor 24 has the magnetic disk 23 mounted thereon. It is driven by the main circuit section 27 to rotate the magnetic disk 23. This spindle motor 24 is constituted by, for example, a DC brushless motor. The magnetic disk 23 is held by the spindle motor 24 fixed to the module base 30 so that one side of the magnetic disk 23 faces the module base 30. Here, the side of the magnetic disk 23 which faces the module base 30 is called the top side. Likewise, the opposite side (which appears in the figure) is called the bottom side. Thus, the spindle motor 24, for example, may be same as a spindle motor which is applied to the product magnetic disk drive.

In addition, the construction of the spindle motor 24 includes a fluid bearing. Therefore, rotation of the spindle motor 24 is limited to one direction according to such factors as the shape of grooves formed in the bearing surface of the fluid bearing.

The carriage 25 has an insertion hole at the center. A bearing unit 32, beside the magnetic disk 23, is fixed to the module base 30. The carriage 25 is pivotably held by the bearing unit 32 which is inserted into the insertion hole. The pivot axis of the carriage 25, which is defined by the bearing unit 32, is outside the magnetic disk 23 and is parallel to the rotation axis of the spindle motor 24.

The other end of the carriage 25 is constituted by a tabular arm 33 which is extended from the pivot axis. The tip of the arm 33 is provided with the mount structure 34 to which a head assembly 40 is detachably attached. In addition, this arm 33 is provided so as to pivot above the top side of the magnetic disk 23. Thus, the head assembly 40 attached to the mount structure 34 is held above the top side of the magnetic disk 23. The construction of the head assembly 40 and that of the mount structure 34 will be described later in detail.

Beside the magnetic disk 23, a retraction area 45 for the arm 33 is also provided. While the arm 33 is retracted to the retraction area 45, a head assembly 40 is attached to or detached from the mount structure 34 of the arm 33.

The other end of the carriage 25, opposite to the arm 33, is provided with a support frame (not shown in the figure) having a coil wound around it. This coil constitutes a part of the voice coil motor 26.

To a side surface of the carriage 25, a FPC (Flexible Printed Circuits) is attached. Connected to the main circuit section 27, the FPC (not shown in the figure) includes wires which are electrically connected with the magnetic head contained in the head assembly 40 and those which are electrically connected with the coil of the voice coil motor 26.

The voice coil motor 26 is driven by the main circuit section 27 to pivot the carriage 25. This voice coil motor 26 comprises a pair of magnets and a coil in the space between the upper and lower magnets. As mentioned above, the coil is provided around one end of the carriage 25. As the result of the voice coil motor 26 pivoting the carriage 25, the magnetic head contained in the head assembly 40 attached to the mount structure 34 is moved above the top side of the magnetic disk 23 substantially in a radial direction thereof. Thus, the voice coil motor 26, for example, may be a voice coil motor which is applied to the product magnetic disk drive.

Figure 4:
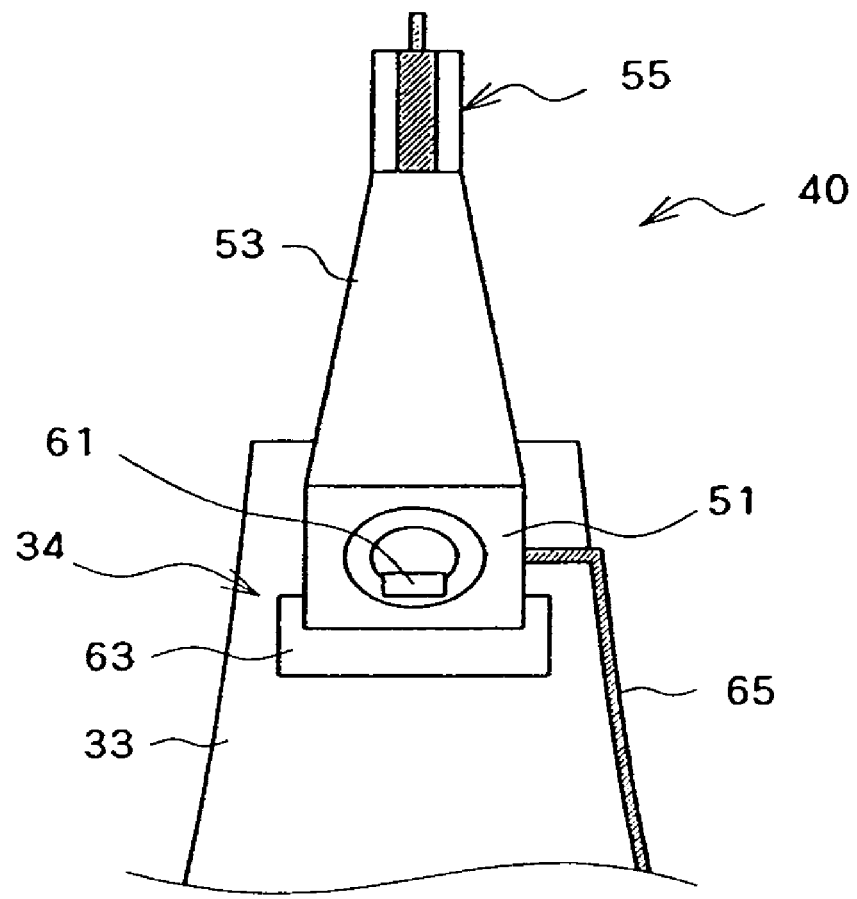
FIG. 4 shows an example of the configuration of a head assembly and that of a mount structure.

FIG. 4 shows an example of how the head assembly 40 and the mount structure 34 are configured. In this figure, the front end portion of the arm 33 is depicted as viewed from above.

The head assembly 40 comprises a plate 51 having a caulking hole formed centrally, a suspension 53 extended in one direction from this plate 51 and a holder portion 55 formed at the front end of this suspension 53. A slider to which a magnetic head is attached is fixed to the bottom surface of the holder portion 55 by a gimbal (not shown in the figure). The magnetic head is connected with lead wires which are extended to the bottom of the plate 51. The slider has an air bearing surface (ABS) which is shaped so as to generate a buoyant force by the viscosity of air.

The mount structure 34 provided in the front end portion of the arm 33 comprises a blade spring 61 and a stopper 63 which are formed on the top surface of the arm 33. The blade spring 61 is protruded upward. As compared with the blade spring 61, the stopper 63 is nearer to the pivot axis (rear side) of the carriage 25. If the blade spring 61 is inserted into the caulking hole of the plate 51, the head assembly 40 is fixed since the blade spring 61 urges the inner perimeter of the caulking hole toward the rear side and therefore presses the plate 51 to the stopper 63. Accordingly, the pickup mechanism 19 of the above-mentioned automatic conveyance system 4 engages a head assembly 40 with the mount structure 34 by pressing the head assembly 40 downward. To disengage a head assembly 40 from the mount structure 34, the pickup mechanism 19 pulls up the head assembly 40. In this case, the configuration is suitably designed to cancel the clamping force of the blade spring 61 when the head assembly 40 is attached or detached. Note that the mount structure 34 is required to be able to attach/detach the head assembly 40, but is not limited to the configuration described here.

The front end portion of the arm 33 has a connector (not shown in the figure) arranged beneath the plate 51 of the head assembly 40 in order to electrically interconnect the head lead wires connected to the magnetic head. This connector is connected to the above-mentioned flexible printed circuit board which is in turn connected to carriage wires 65 arranged along a side of the arm 33. Thus, the magnetic head included in the head assembly 40 is electrically connected with the main circuit section 27.

Resuming the description of FIG. 3, the main circuit section 27 is similar in configuration to a circuit which is applied to the product magnetic disk drive. Namely, the main circuit section 27 includes a micro processing unit (MPU), a hard disk controller (HDU), a read write channel (R/W channel), a motor driver and a head amplifier. Alternatively, the head amplifier may be mounted on the flexible printed circuit board attached to a side of the carriage 25. The main circuit section 27 also includes a memory in which programs are stored to allow the MPU to perform various types of control by retrieving and executing them. Thus, the spindle motor 24 and voice coil motor 26 mounted on the module base 30 and the magnetic head included in the head assembly 40 attached to the carriage 25 can be controlled by the main circuit 27 in the same manner as in the product magnetic disk drive.

Of the various kinds of control implemented by the main circuit section 27 as in the product magnetic disk drive, read/write control and positioning control are mainly utilized in the inspection of magnetic heads.

Through the read/write control by the main circuit section 27, write and read processes can be implemented. In the write process, write data entered from the inspection circuit section 21 ranked higher than the main circuit section 21 is given encoding and other predetermined operations and output to the magnetic head for write onto the magnetic disk 23. In the read process, read data retrieved by the magnetic head from the magnetic disk 23 is given decoding and other predetermined operations and output to the higher-ranked inspection circuit section 21.

Through the positioning control by the main circuit section 27, it is possible to implement a seek/positioning process. In the seek/positioning process, the current position of the magnetic head on the magnetic disk 23 is determined from the servo data contained in the read data retrieved by the magnetic head from the magnetic disk 23. Then, a position error signal (PES) is generated from the difference between the current position and the target position supplied from the higher-ranked inspection circuit section 21. The voice coil motor 26 is driven according to this PES.

The main circuit section 27 in the present embodiment uses the same circuitry as the one applied to the product magnetic disk drive. Alternatively, it is also possible to construct a specific circuit capable of executing the read/write control and positioning control to inspect a magnetic head.

The inspection circuit section 21 instructs the main circuit section 27 to perform read/write control and positioning control in order to inspect the performance of a magnetic head as predetermined. This inspection circuit section 21 is constructed as a computer comprising a CPU, ROM and RAM. In the storage section composed of ROM or the like, a program is stored to implement the function of the inspection circuit section 21.

In detail, when instructing the main circuit section 27 to perform positioning control, the inspection circuit section 21 specifies the target position of the magnetic head. In this case, one of the plural tracks formed on the magnetic disk 23 is specified as the inspection-implementing track. Namely, the track number of the inspection-implementing track, which indicates the position thereof, is presented as the target position of the magnetic head. Receiving the instruction, the main circuit section 27 generates a PES by using the position of the inspection-implementing track as the target position of the magnetic head and, based on this PES, drives the voice coil motor 26 so that the magnetic head contained in the head assembly 40 attached to the carriage 25 seeks and settles on the inspection-implementing track on the magnetic disk 23. In addition, depending on the characteristics to be inspected, the magnetic head may be shifted by a certain amount from the center of the inspection-implementing track by adding a constant value to the PES.

To perform a read/write process, the inspection circuit section 21 instructs the main circuit section 27 to implement read/write control. This read/write process is performed in order to inspect the read/write performance of the magnetic head. The characteristics to be inspected include, for example, high frequency output, low frequency output, resolution, output fluctuation, output asymmetry, overwrite, non-linear transition shift, magnetic write width, magnetic read width, magnetic core width, head noise and bit error rate. Detailed inspection conditions which are applied to these inspection items are given by inspection conditions received from the host computer 1. Receiving an instruction, the main circuit section 27 performs a read/write process on the inspection-implementing track in order to inspect the above-mentioned characteristics. The read/write process may include write operations which are done while changing the frequency and magnitude of the write signal output from the magnetic head, read operations which are done with the magnetic head dislocated by a certain amount from the track center and alternate read and write operations which are repeated a certain number of times. Acquiring data which are output from the main circuit section 27 during these read and write operations, the inspection circuit section 21 generates inspection results by inspection item.

Of the magnetic head inspection items, "bit error rate" can be inspected advantageously in a more in-situ environment if the inspection module 12 includes more components which are applied to the product magnetic disk drive. That is, since occurrence of bit errors is attributable to not only the read/write characteristics of the magnetic head but also the characteristics of data transmission and other components in the main circuit section 27, it is possible to estimate the rate of bit errors which the magnetic head would cause in a product magnetic disk drive if the inspection module 12 uses components which are applied to the product magnetic disk drive. Thus, the bit error rate can be judged to be good or not before the head assembly 40 is incorporated into a product magnetic disk drive.

The magnetic head may have a heater embedded therein to adjust the flying height through heating by this heater. To inspect a head assembly 40 containing this kind of magnetic head, the main circuit section 27 may be configured so as to include a control function to adjust the flying height of the magnetic as instructed by the inspection circuit section 21.

Figure 5:
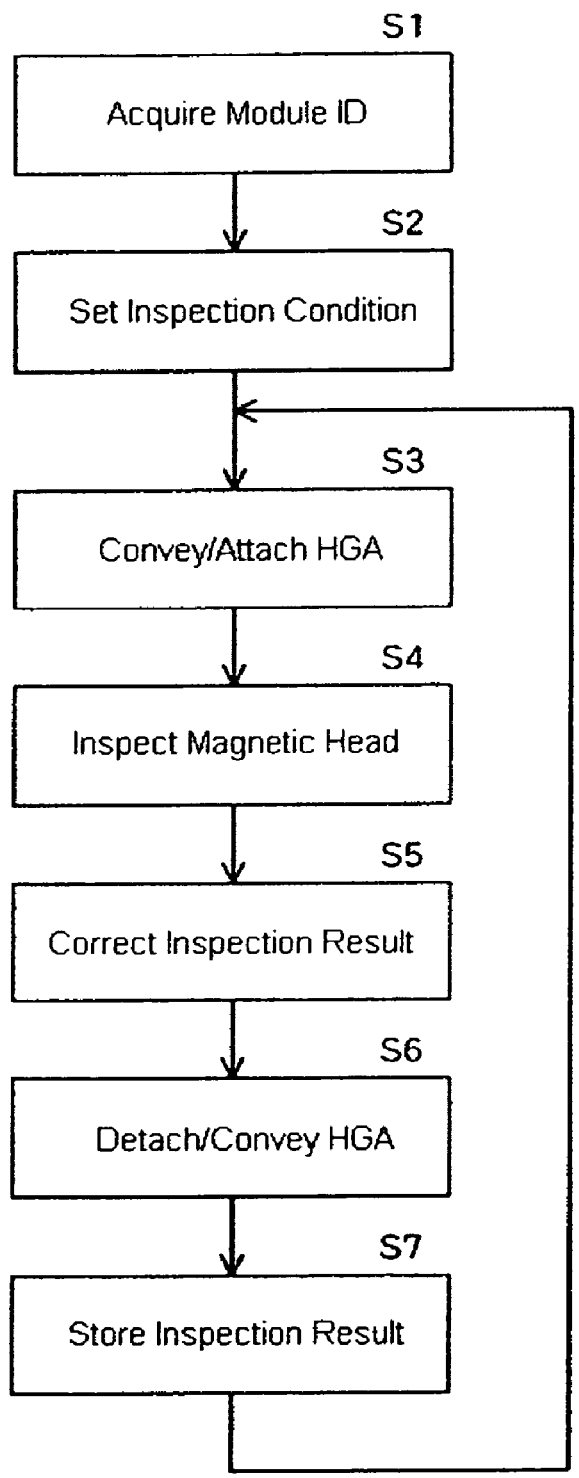
FIG. 5 is a flowchart showing the flows of a magnetic head inspection method according to an embodiment of the present invention.

The following provides a description of a magnetic head inspection method according to an embodiment of the present invention which is implemented by the magnetic head inspection system described so far with reference to FIG. 1 through FIG. 4. FIG. 5 is a flowchart showing the flows of this method.

In S1, the module ID of each of the inspection modules arranged on the inspection stage 11 is read into the host computer 1 by the module ID reader 6. The magnetic recording characteristics of the magnetic disk 23 mounted on each inspection module 12 have already been measured and stored in the host computer 1 as module correction factors in association with the module ID of the inspection module 12. Which module correction factors are to be used for an inspection module 12 arranged on the inspection stage 12 is determined from the read module ID.

In S2, if lot information about the head assemblies 40 to be inspected is specified, the host computer 1 reads out inspection conditions associated with this lot information from the lot control server 7 and sets the retrieved inspection conditions to each inspection circuit section 21.

In S3, the host computer 1 instructs the automatic conveyance system 4 to convey a head assembly placed in the supply tray 14 to an inspection module 12. As instructed, the automatic conveyance system 4 conveys the head assembly 40 from the supply tray 14 to the inspection module 12 and attaches the head assembly 40 to the mount structure 34 of the carriage 25 set on the inspection module 12. In addition, a serial number given to the head assembly 40 is read into the host computer 1 by the serial reader 5 while the head assembly 40 is conveyed.

In S4, the inspection circuit section 21 of the inspection module 12 where the head assembly 40 is mounted is instructed by the host computer 1 to start inspection. As instructed, the inspection circuit section 21 instructs the main circuit section 27 of the inspection module 12 to move the magnetic head to an inspection-implementing track and perform certain read/write operations to inspect the magnetic head. Upon completion of the inspection, the inspection circuit section 21 sends an inspection completion notification and inspection result to the host computer 1.

In S5, based on the module correction factors stored in association with the module ID of this inspection module 12, the host computer 1 corrects the inspection result received from the inspection module 12.

In S6, according to the corrected inspection result, the host computer 1 instructs the automatic conveyance system 4 to convey the head assembly 40 to a sorting tray 15 of the corresponding grade. As instructed, the automatic conveyance system 4 detaches the head assembly 40 from the mount structure 34 and conveys it to a sorting tray 15 of the corresponding grade.

In S7, together with serial number and other information about the head assembly 40 and module ID and other inspection-related information, the host computer 1 stores the corrected inspection result in the database server 8.

Note that steps S3 through S7 are implemented so that a plurality of inspection modules 12 work concurrently. Namely, since the host computer 1 sequentially instructs a plurality of inspection modules 12 to attach head assemblies 40 thereto and inspect the magnetic heads (S3, S4), a plurality modules 12 concurrently inspect magnetic heads. If an inspection module 12 completes the inspection, the host computer 1 corrects the inspection result and instructs the inspection module 12 to detach the head assembly 40 (S5 to S7), attach a new head assembly 40 and inspect the magnetic head.

According to the embodiment of the magnetic head inspection system described so far, it is possible to inspect a magnetic heads by using a simple inspection module 12 which is configured in substantially the same manner as in the product magnetic disk drive. In addition, the magnetic head inspection throughput can be raised by arranging a plurality of inspection modules 12 to concurrently inspect magnetic heads.

In addition, since the inspection module 12 is composed of a magnetic disk 23, spindle motor 24, carriage 25, voice coil motor 26 and main circuit section 27 set on a module base 30, it is only necessary to replace the inspection module 12 with an appropriate one even if the type of head assembly 40 to be inspected is changed. Since it is not necessary to change the remaining configuration of the magnetic head inspection system, it is possible to prepare quickly and easily for different-type head assemblies 40.

In addition, since a head assembly 40 attached to the mount structure 34 on the arm 33 of the carriage 25 is held above the top side of the magnetic disk 23, the automatic conveyance system 4 can easily attach/detach the head assembly 40 to/from the inspection module 12.

In addition, since the inspection module 12 is simply configured in the same manner as in a product magnetic disk drive, it is possible to reduce the size and lower the cost of the inspection apparatus as compared with conventional magnetic head inspection apparatus.

In addition, since the automatic conveyance system 4 attaches/detaches a head assembly 40 to/from the mount structure 34 of the carriage 25 set on the inspection module 12, it is possible to not only raise the magnetic head inspection throughput but also eliminate such problems as electrical damage which would occur if the attachment/detachment is done manually.

The following describes types of head assemblies 40. According to whether it is set to a magnetic disk's top side or bottom side, a head assembly 40 is classified as one of two types: top side head assembly and bottom side head assembly. The former is set to the top side while the latter is to the bottom side. A head assembly 40 comprises a slider having a magnetic head attached thereto. Each type's slider has a different ABS shape although there is no other structural difference between the top side type and the bottom side type. Namely, since the air flow to which a slider is subject differs depending on whether it is set above or below the rotating magnetic disk, the slider's ABS shape of a top side head assembly is made symmetrical to the slider's ABS shape of a bottom side head assembly.

Accordingly, it is not possible to apply both top side and bottom side head assemblies to inspection modules 12 of the same configuration if any head assembly 40 is held above the top side of the magnetic disk 23 by the carriage 25 as shown in FIG. 3 so that the automatic conveyance system 4 can easily attach/detach the head assembly 40. This is because rotation of the spindle motor 24, that is, the rotation of the magnetic disk is limited to one direction and the arm 33 of the carriage 25 is extended in the rotating direction of the magnetic disk 23. Therefore, if both top and side head assemblies and bottom side head assemblies are applied to the same configuration, top side head assemblies or bottom side head assemblies can not fly normally.

Figure 6A:
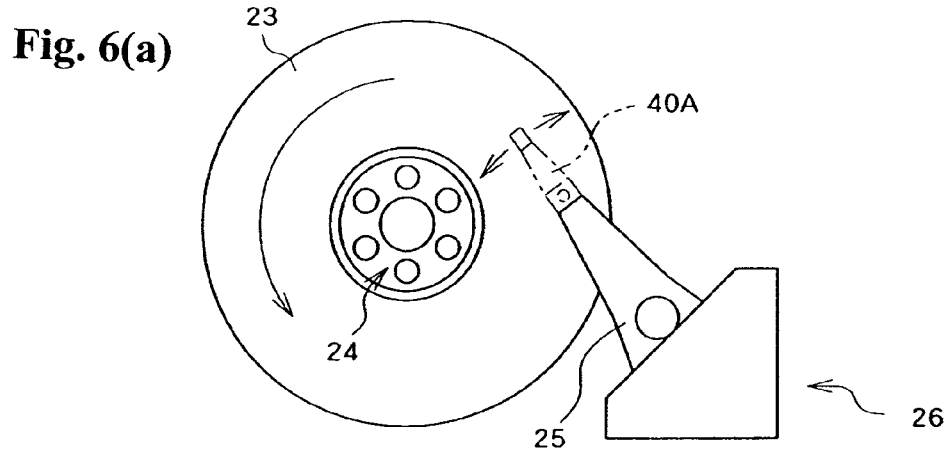
FIGS. 6(A) and 6(B) are provided to explain each type of head assembly.
Figure 6B:
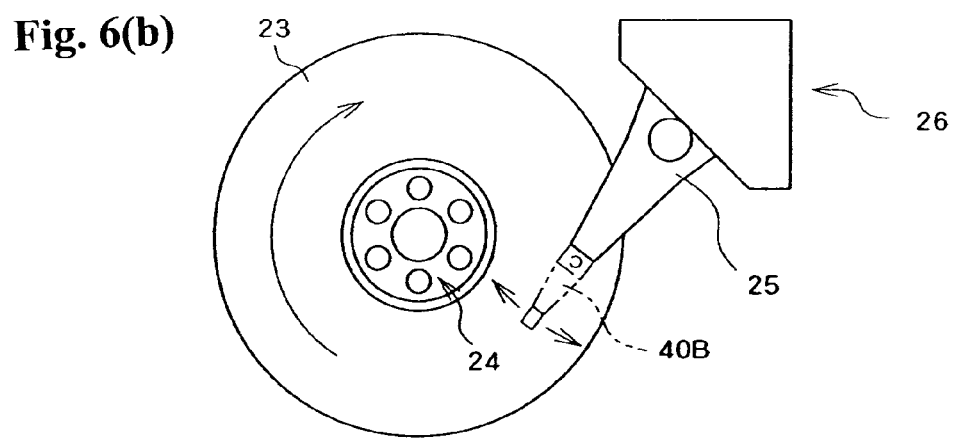

Therefore, two types of inspection modules 12, as shown in FIG. 6, are required. One shown in FIG. 6(A) is for top side head assemblies which are to be held above magnetic disks 23 in product magnetic drives and the other shown in FIG. 6(B) is for bottom side head assemblies. Similar to FIG. 3, the module base 30 is viewed from above and the top side of the magnetic disk 23 appears. In structure (B), the magnetic disk 23 is rotated in the opposite direction by the spindle motor 24. Consequently, the carriage 25 and the voice coil motor 26 are different in location and direction from those in (A).

Thus, if any head assembly is held above the top side of the magnetic disk 23 for inspection, one inspection module 12 can support only one type of head assembly 40, top side head assembly 40A or bottom side head assembly 40B depending on the rotating direction of the spindle motor 24 to rotate the magnetic disk 23.

Further, it may be preferable to configure the present magnetic head inspection system embodiment so that all inspection modules 12 arranged on the inspection stage 11 are for top side head assemblies or bottom side head assemblies. Configuring a magnetic head inspection system dedicated for head assemblies 40 of one type can simplify the instruction system of the host computer 1 and the layout of the inspection stage 11 since two types of head assemblies 40 are not allowed to intermingle on the inspection stage 11.

Figure 7:
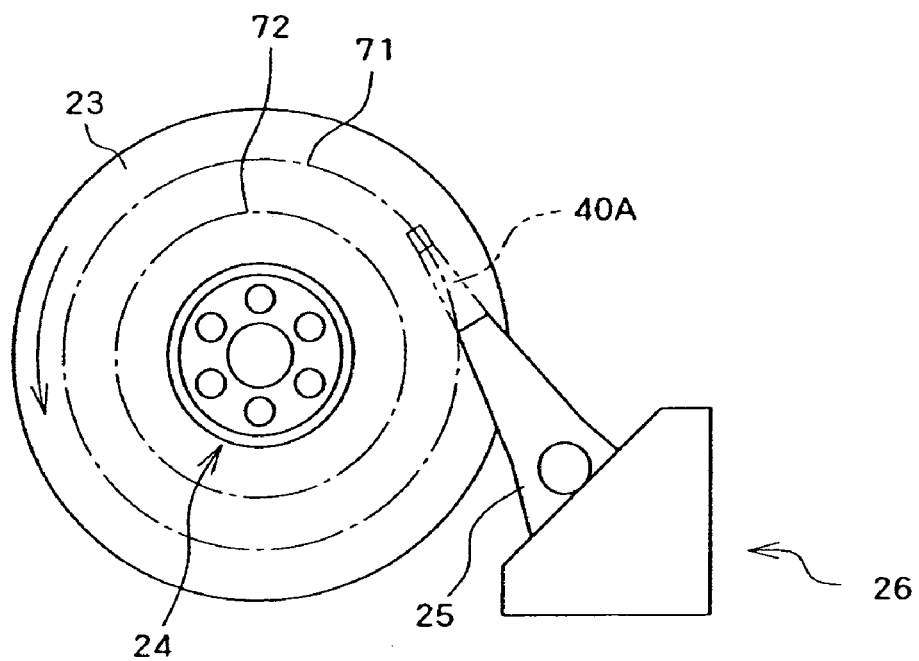
FIG. 7 is provided to explain how a magnetic head is positioned.

The following describes an example of a function of the inspection circuit section 21. As shown in FIG. 7, the inspection circuit section 21 switches the inspection-implementing track between plural tracks 71 and 72 which are apart from each other by a certain distance. The distance between the plural tracks 71 and 72 or candidates for the inspection-implementing track may be set wider than the slider contained in the head assembly 40.

The magnetic disk 23 is typically coated with fluorinated lubricant as a lubrication film. If the magnetic head of the head assembly 40 continues to be positioned to one track on the magnetic disk 23, the lubrication film is thinned along the track since the lubricant is moved aside there due to the wind pressure given by the slider of the head assembly. This incurs the possibility of the slider clashing against the magnetic disk 23. By switching the inspection-implementing track between the plural tracks 71 and 72 as described above, it is possible to extend the operation life of the magnetic disk.

Switching the inspection-implementing track can be implemented by, for example, alternately using plural candidate tracks 71 and 72. In this case, the time required by one track to recover the lubrication film can be secured while the other track is used. Alternatively, switching the inspection-implementing track between the plural tracks 71 and 72 may be done after one track is continuously used.

The inspection-implementing track may also be switched each time a certain number of head assemblies 40 are inspected or a certain number of characteristics of a head assembly 40 are inspected.

In addition, the inspection-implementing track may also be switched if an inspection result determined from the data output from the main circuit section 27 is found abnormal. For example, if a bit error rate inspection result is abnormal due to a sharp increase of bit errors or concentrated bit errors at a certain place, it may be inferred that the slider clashed against the magnetic disk 23. In this case, the plural candidates 71 and 72 for the inspection-implementing track should be updated.

The inspection circuit section 21 can change the inspection-implementing track by specifying the track number of a new inspection-implementing track as the target position to the main circuit section 27. If the target position is changed, the main circuit section 27 performs control so that the magnetic head seeks the new inspection-implementing track and settles thereon.

Figure 8:
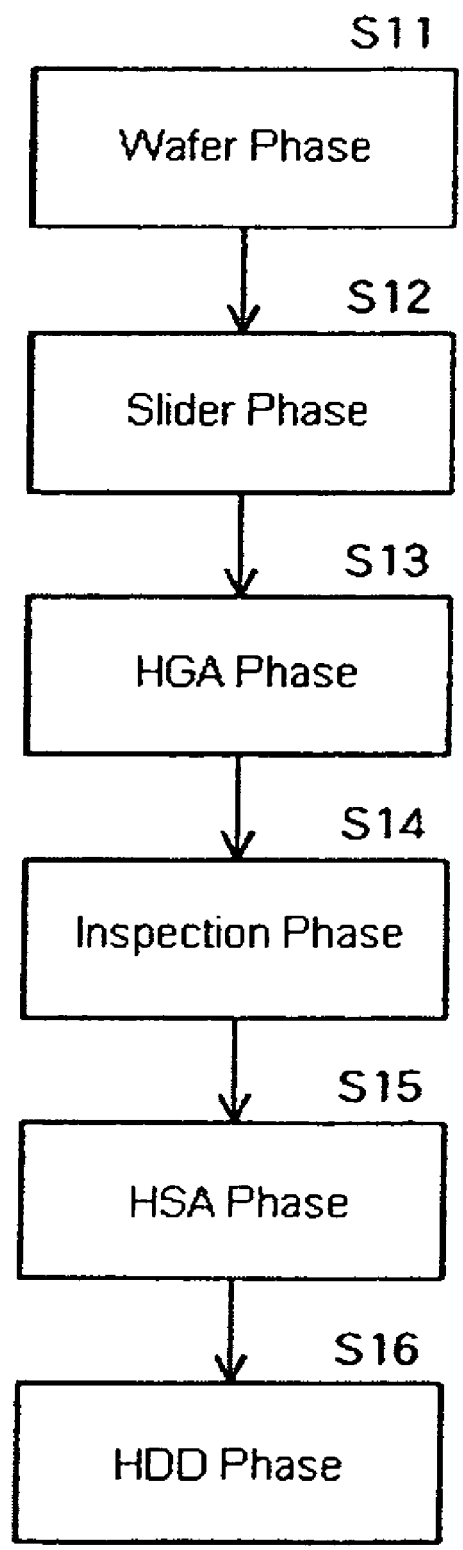
FIG. 8 is a flowchart showing a process of manufacturing a magnetic disk drive.

The following describes a magnetic disk drive manufacturing method according to an embodiment of the present invention. FIG. 8 is a flowchart of the manufacturing method. The inspection step S14 of the present magnetic disk drive manufacturing method of the present embodiment includes a magnetic head inspection method implemented by the aforementioned magnetic head inspection system.

The magnetic disk drive manufacturing method comprises: a wafer step (S11) of forming on a wafer a write element and read element which constitute a magnetic head; a slider step (S12) of cutting a bar from the wafer to obtain a slider integrated with the magnetic head by performing polishing, cleaning, protective film formation and ABS shaping; a HGA step (S13) of attaching the slider to a suspension to obtain a HGA as the aforementioned head assembly by electrically connecting the head; an inspection step (S14) of screening the HGA by using the aforementioned magnetic head inspection system (S14); a HSA step (S15) of obtaining a head stack assembly (HSA) by attaching the passed HGA to a carriage; and a HDD step (S16) of obtaining a magnetic disk drive by mounting the HAS, magnetic disk and others to a cabinet and attaching a circuit board, which has the main circuit section formed thereon, to the cabinet.

What is claimed is:

1. A magnetic head inspection system comprising one or a plurality of inspection modules each of which includes:
   a magnetic disk where servo data including track identifier information are recorded;
   a spindle motor to rotates the magnetic disk;
   a support member which has a mount structure to which a head assembly including a magnetic head is detachably secured and can pivot around a pivot axis defined outside the magnetic disk;
   a voice coil motor which drives the support member to pivot so that the magnetic head included in the head assembly mounted on the support member is moved over the magnetic disk substantially in a radial direction thereof; and
   a main circuit section which is electrically connected with the magnetic head included in the head assembly mounted on the support member and can execute read write control to read data from and write data to the magnetic disk by the magnetic head and positioning control to drive the voice coil motor based on the servo data included in the data retrieved from the magnetic disk; wherein
   each of the one or plurality of inspection modules is provided with an inspection circuit section which instructs the main circuit section to execute the positioning control to move the magnetic head included in the head assembly mounted on the support member to a specific track on the magnetic disk and the read write control to perform a certain read write operation by the magnetic head in order to inspect the performance of the magnetic head.

2. The magnetic head inspection system according to claim 1, further comprising a conveyance mechanism which conveys the head assembly and attaches and detaches the head assembly to and from the mount structure of the support member.

3. The magnetic head inspection system according to claim 1 wherein in each of the one or plurality of inspection modules, at least the magnetic disk, the spindle motor, the support member and the voice coil motor are installed on a module base.

4. The magnetic head inspection system according to claim 2 wherein in each of the one or plurality of inspection modules, at least the magnetic disk, the spindle motor, the support member and the voice coil motor are installed on a module base.

5. The magnetic head inspection system according to claim 1 wherein in each of the one or plurality of inspection modules, the support member supports the head assembly above the top side of the magnetic disk installed on a module base.

6. The magnetic head inspection system according to claim 2 wherein in each of the one or plurality of inspection modules, the support member supports the head assembly above the top side of the magnetic disk installed on a module base.

7. The magnetic head inspection system according to claim 3 wherein in each of the one or plurality of inspection modules, the support member supports the head assembly above the top side of the magnetic disk installed on the module base.

8. The magnetic head inspection system according to claim 4 wherein in each of the one or plurality of inspection modules, the support member supports the head assembly above the top side of the magnetic disk installed on the module base.

9. The magnetic head inspection system according to claim 1 wherein in each of the one or plurality of inspection modules:
   the spindle motor contains a fluid bearing;
   the support member keeps the head assembly above the top side of the magnetic disk installed on a module base;
   of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

10. The magnetic head inspection system according to claim 2 wherein in each of the one or plurality of inspection modules:
   the spindle motor contains a fluid bearing;
   the support member keeps the head assembly above the top side of the magnetic disk installed on a module base;
   of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

11. The magnetic head inspection system according to claim 3 wherein in each of the one or plurality of inspection modules:
the spindle motor contains a fluid bearing;
the support member keeps the head assembly above the top side of the magnetic disk installed on a module base;
of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

12. The magnetic head inspection system according to claim 4 wherein in each of the one or plurality of inspection modules:
the spindle motor contains a fluid bearing;
the support member keeps the head assembly above the top side of the magnetic disk installed on a module base;
of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

13. The magnetic head inspection system according to claim 5 wherein in each of the one or plurality of inspection modules:
the spindle motor contains a fluid bearing;
the support member keeps the head assembly above the top side of the magnetic disk installed on a module base;
of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

14. The magnetic head inspection system according to claim 6 wherein in each of the one or plurality of inspection modules:
the spindle motor contains a fluid bearing;
the support member keeps the head assembly above the top side of the magnetic disk installed on a module base;
of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

15. The magnetic head inspection system according to claim 7 wherein in each of the one or plurality of inspection modules:
the spindle motor contains a fluid bearing;
the support member keeps the head assembly above the top side of the magnetic disk installed on a module base;
of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

16. The magnetic head inspection system according to claim 8 wherein in each of the one or plurality of inspection modules:
the spindle motor contains a fluid bearing;
the support member keeps the head assembly above the top side of the magnetic disk installed on a module base;
of a first type of head assembly arranged on a first side of a magnetic disk in a magnetic disk drive and a second type of head assembly arranged on a second side thereof, only one of the head assembly types determined depending on the rotating direction of the spindle motor and the top side condition of the magnetic disk, is allowed to be set to the support member.

17. The magnetic head inspection system according to claim 1 wherein the inspection circuit section switches the specific track between a plurality of tracks which are apart from each other by a distance larger than the width of the slider contained in the head assembly.

18. The magnetic head inspection system according to claim 2 wherein the inspection circuit section switches the specific track between a plurality of tracks which are apart from each other by a distance larger than the width of the slider contained in the head assembly.

19. The magnetic head inspection system according to claim 3 wherein the inspection circuit section switches the specific track between a plurality of tracks which are apart from each other by a distance larger than the width of the slider contained in the head assembly.

20. The magnetic head inspection system according to claim 4 wherein the inspection circuit section switches the specific track between a plurality of tracks which are apart from each other by a distance larger than the width of the slider contained in the head assembly.

21. The magnetic head inspection system according to claim 5 wherein the inspection circuit section switches the specific track between a plurality of tracks which are apart from each other by a distance larger than the width of the slider contained in the head assembly.

22. The magnetic head inspection system according to claim 6 wherein the inspection circuit section switches the specific track between a plurality of tracks which are apart from each other by a distance larger than the width of the slider contained in the head assembly.

23. The magnetic head inspection system according to claim 7 wherein the inspection circuit section switches the specific track between a plurality of tracks which are apart from each other by a distance larger than the width of the slider contained in the head assembly.

24. The magnetic head inspection system according to claim 8 wherein the inspection circuit section switches the specific track between a plurality of tracks which are apart from each other by a distance larger than the width of the slider contained in the head assembly.

25. The magnetic head inspection system according to claim 9 wherein the inspection circuit section switches the specific track between a plurality of tracks which are apart from each other by a distance larger than the width of the slider contained in the head assembly.

26. The magnetic head inspection system according to claim 10 wherein the inspection circuit section switches the specific track between a plurality of tracks which are apart from each other by a distance larger than the width of the slider contained in the head assembly.

27. The magnetic head inspection system according to claim 11 wherein the inspection circuit section switches the specific track between a plurality of tracks which are apart from each other by a distance larger than the width of the slider contained in the head assembly.

28. The magnetic head inspection system according to claim 12 wherein the inspection circuit section switches the specific track between a plurality of tracks which are apart from each other by a distance larger than the width of the slider contained in the head assembly.

29. The magnetic head inspection system according to claim 13 wherein the inspection circuit section switches the specific track between a plurality of tracks which are apart from each other by a distance larger than the width of the slider contained in the head assembly.

30. The magnetic head inspection system according to claim 14 wherein the inspection circuit section switches the specific track between a plurality of tracks which are apart from each other by a distance larger than the width of the slider contained in the head assembly.

31. The magnetic head inspection system according to claim 15 wherein the inspection circuit section switches the specific track between a plurality of tracks which are apart from each other by a distance larger than the width of the slider contained in the head assembly.

32. The magnetic head inspection system according to claim 16 wherein the inspection circuit section switches the specific track between a plurality of tracks which are apart from each other by a distance larger than the width of the slider contained in the head assembly.

33. A magnetic head inspection method which uses one or plurality of inspection modules, each of which comprises:
   a magnetic disk where servo data including track identifier information are recorded;
   a spindle motor to rotates the magnetic disk;
   a support member which has a mount structure to which a head assembly including a magnetic head is detachably secured and can pivot around a pivot axis defined outside the magnetic disk;
   a voice coil motor which drives the support member to pivot so that the magnetic head included in the head assembly mounted on the support member is moved over the magnetic disk substantially in a radial direction thereof; and
   a main circuit section which is electrically connected with the magnetic head included in the head assembly mounted on the support member and can execute read write control to read data from and write data to the magnetic disk by the magnetic head and positioning control to drive the voice coil motor based on the servo data included in the data retrieved from the magnetic disk; wherein
   each of the one or plurality of inspection modules is instructed to execute the positioning control to move the magnetic head included in the head assembly mounted on the support member to a specific track on the magnetic disk and the read write control to perform a certain read write operation by the magnetic head in order to inspect the performance of the magnetic head.

34. A magnetic disk drive manufacturing method including a magnetic head inspection method cited in claim 33.

* * * * *